(12) United States Patent
Kwan et al.

(10) Patent No.: US 6,658,459 B1
(45) Date of Patent: *Dec. 2, 2003

(54) SYSTEM FOR SHARING PERIPHERAL DEVICES OVER A NETWORK AND METHOD FOR IMPLEMENTING THE SAME

(75) Inventors: Tony G. Kwan; Yafu J. Ding, both of Milpitas, CA (US)

(73) Assignee: Adaptec, Inc., Milpitas, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/032,364

(22) Filed: Feb. 27, 1998

(51) Int. Cl.⁷ .............................................. G06F 15/16
(52) U.S. Cl. ...................... 709/217; 709/236; 709/250; 709/219; 709/321; 710/62; 710/5
(58) Field of Search ................................ 709/203, 228, 709/221, 220, 236, 301, 217, 230, 326, 250, 246, 222, 219; 710/2, 5, 10, 62, 64

(56) References Cited

U.S. PATENT DOCUMENTS

| | | | | |
|---|---|---|---|---|
| 5,299,314 A | * | 3/1994 | Gates et al. | 709/200 |
| 5,491,812 A | * | 2/1996 | Pisello et al. | 709/500 |
| 5,555,374 A | * | 9/1996 | Amerdine et al. | 709/200 |
| 5,640,541 A | * | 6/1997 | Bartram et al. | 395/500 |
| 5,742,833 A | * | 4/1998 | Dea et al. | 713/323 |
| 5,937,169 A | * | 8/1999 | Connery et al. | 709/250 |
| 5,938,752 A | * | 8/1999 | Lueng et al. | 710/126 |
| 5,956,484 A | * | 9/1999 | Rosenberg et al. | 709/203 |
| 5,991,813 A | * | 11/1999 | Zakarrow | 709/236 |
| 5,991,829 A | * | 11/1999 | Giorgio et al. | 710/15 |
| 5,996,024 A | * | 11/1999 | Blumenau | 700/301 |
| 6,052,779 A | * | 4/2000 | Jackson et al. | 713/2 |
| 6,058,494 A | * | 5/2000 | Gold et al. | 713/201 |

OTHER PUBLICATIONS

Adaptec, Inc., "ASPI Frequently Asked Questions", (www.adaptec.com/support/faqs/aspi.html), pp. 1–4, Feb., 1998, Adaptec, Inc.

* cited by examiner

Primary Examiner—Moustafa M. Meky
Assistant Examiner—Abdullahi E. Salad
(74) Attorney, Agent, or Firm—Martine & Penilla, LLP

(57) ABSTRACT

Disclosed is a system for establishing a communication link between a client computer and a peripheral device that is remotely networked to the client computer. The system includes a translation adapter that is networked with the client computer through a first network adapter of the translation adapter. The translation adapter includes a SCSI controller that connects to the peripheral device. The system also includes a SCSI-to-TCP/IP driver that is loaded on the client computer and is configured to detect when the translation adapter is networked to the client computer, and is further configured to generate a TCP/IP packet. In addition, the system includes a second network adapter that is connected to the client computer and configured to receive the TCP/IP packet that is generated by the SCSI-to-TCP/IP driver. The second network adapter is further configured to transmit the TCP/IP packet to the first network adapter of the translation adapter, and the translation adapter is configured to translate the TCP/IP packet into a SCSI command that is communicated to the peripheral device that is connected to the translation adapter.

21 Claims, 12 Drawing Sheets

SYSTEM FOR SHARING PERIPHERAL DEVICES OVER A NETWORK AND METHOD FOR IMPLEMENTING THE SAME

BACKGROUND OF THE INVENTION

1. Field of the Invention

This invention relates generally to computer peripheral devices, and more particularly to network devices and methods that enable the sharing of peripheral devices with multiple clients over a network.

2. Description of the Related Art

Recently, computer users have enjoyed substantial flexibility in the way their computers are equipped. This flexibility is primarily due to the increased use of peripheral devices, which allow computer users to purchase only those hardware devices that make sense for their particular work requirements. In fact, the variety of available peripheral devices is ever increasing, which necessarily requires that they be well integrated with the computer's existing software. Although most peripheral device manufactures are able to provide excellent software drivers that enable the full functionality of the peripheral devices when they are connected to a local computer, other computers that are coupled to the same network are generally not able to access or utilize those peripheral devices.

With this in mind, FIG. 1A shows a network diagram 100 having several computers 102 connected to a server computer 104. In this arrangement, the computers 102 function as client computers which are capable of storing and retrieving information from the server computer 104. In this example, the server computer 104 has a SCSI adapter card 106 which enables it to communicate with SCSI peripheral devices 108a through 108c. The server computer 104 also includes specialized software for handling communication between the client computers 102a through 102d and the SCSI peripheral devices 108a through 108c.

FIG. 1B shows a prior art block diagram of several functional blocks implemented by the server computer 104. In this simplified example, the server computer 104 includes an operating system 120, which is in communication with a file manager 122. The file manager 122 is capable of communicating with a network manager 124 and several local managers, including a tape drive manager 126, a hard disk manager 127, a CDROM manager 128, and a special (scanner) manager 129.

The local managers are thus capable of communicating with files and data that may be stored in a data storage unit 130. A controller 132 is shown in communication with the data storage 130 and the SCSI adapter card 106 of FIG. 1A. The SCSI adapter card 106 therefore communicates with the peripheral devices 108a through 108c. As further shown in FIG. 1B, the server computer 104 is connected to a network via an Ethernet adapter 136, which communicates with the network manager 124.

By implementing the server computer 104 arrangement, it is possible for the client computers 102a through 102d to communicate with the server computer 104 and access one or more of the peripheral devices 108a through 108c. That is, a client computer 102 will typically couple up to a network through its own Ethernet adapter card which enables communication to the Ethernet adapter 136 of the server computer 104. In this manner, data can then be transferred between the various network computers by passing standard Ethernet packets.

Although it is possible for the client computers 102a through 102d to access the server 104 in order to access to the peripheral devices 108a through 108c, the cost associated with purchasing and setting up the server 104 for the sole purpose of sharing several peripheral devices can be quite large. For example, file servers generally require specialized network operating system software, and a network administrator to continuously manage the operation of the server computer 104 and the various clients that are interacting with that server computer 104. In addition, special storage and office space allocation must be made in order to properly manage, network, and manage the server computer 104.

Thus, even though this arrangement may work in some large corporate environments, the sharing of the peripheral devices 108a through 108c via a specialized server computer 104 can be prohibitively expensive for small office environments as well as home office networks. Alternatively, the users of a small network may purchase redundant peripheral devices for each computer. Of course, this may not make sense if only several computers are networked together and a single peripheral device can fill the needs of the several network computer users.

In view of the foregoing, there is a need for a network device and a method that enables several client computers that are networked together to share remotely networked peripheral devices without employing expensive server computer systems.

SUMMARY OF THE INVENTION

Broadly speaking, the present invention fills these needs by providing a method, a system, and an apparatus for transparently sharing remotely networked peripheral devices with local client computers. The method and apparatus advantageously eliminates the need for expensive server computer systems that are solely used for peripheral device sharing. Thus, client computers of the present invention are able to access peripheral devices that are remotely coupled to a shared network as if the peripheral devices were actually connected to each local client computer system. It should be appreciated that the present invention can be implemented in numerous ways, including as a process, an apparatus, a system, a device, a method, or a computer readable medium. Several inventive embodiments of the present invention are described below.

In one embodiment, a method for accessing a remote peripheral device from a client computer is disclosed. The client computer has a network adapter for connecting to a network. The method includes generating a request through an operating system of the client computer, and encapsulating the request in a TCP/IP packet. The method further includes transmitting the TCP/IP packet through the network adapter to a translation adapter that is configured to decode the TCP/IP packet back into the request that is then passed to the peripheral device that is connected to the translation adapter. Preferably, the transmitting of the TCP/IP packet through the network adapter includes sending the TCP/IP packet to a transport driver interface before the TCP/IP packet is passed to the network adapter of the client computer.

In another embodiment, a system for establishing a communication link between a client computer and a peripheral device that is remotely networked to the client computer is disclosed. The system includes a translation adapter that is networked with the client computer through a first network adapter of the translation adapter. The translation adapter further includes a SCSI controller that connects to the peripheral device. The system further includes a SCSI-to-TCP/IP driver that is loaded on the client computer and configured to detect when the translation adapter is networked to the client computer, and is further configured to generate a TCP/IP packet. In addition, the system includes a second network adapter that is connected to the client computer and configured to receive the TCP/IP packet that is generated by the SCSI-to-TCP/IP driver. The second network adapter is further configured to transmit the TCP/IP packet to the first network adapter of the translation adapter, and the translation adapter is configured to translate the TCP/IP packet into a SCSI command that is communicated to the peripheral device that is connected to the translation adapter.

In yet a further embodiment, an apparatus for establishing a data transfer link between a client computer and a peripheral device that is remotely networked to the client computer is disclosed. The apparatus includes a translation means that is networked with the client computer through a first Ethernet controller of the translation means. The translation means further includes a SCSI controller that is physically coupled to the peripheral device. A SCSI-to-TCP/IP converting means is loaded on the client computer and is configured to detect when the translation means is networked to the client computer, and is further configured to produce a TCP/IP packet from one of a SCSI command and SCSI data. The apparatus also includes a second Ethernet controller that is connected to the client computer and is configured to receive the TCP/IP packet that is produced by the SCSI-to-TCP/IP converting means. The second Ethernet controller is further configured to transmit the TCP/IP packet to the first Ethernet controller of the translation means, and the translation means is configured to convert the TCP/IP packet back into one of the SCSI command and the SCSI data that is directed to the peripheral device that is physically coupled to the translation means.

Other aspects and advantages of the invention will become apparent from the following detailed description, taken in conjunction with the accompanying drawings, illustrating by way of example the principles of the invention.

BRIEF DESCRIPTION OF THE DRAWINGS

The present invention will be readily understood by the following detailed description in conjunction with the accompanying drawings, and like reference numerals designate like structural elements.

DETAILED DESCRIPTION OF THE PREFERRED EMBODIMENTS

An invention is described for a method, a system, and an apparatus for transparently sharing remotely networked peripheral devices with local client computers. It will be obvious, however, to one skilled in the art, that the present invention may be practiced without some or all of these specific details. In other instances, well known process operations have not been described in detail in order not to unnecessarily obscure the present invention.

Figure 1A:
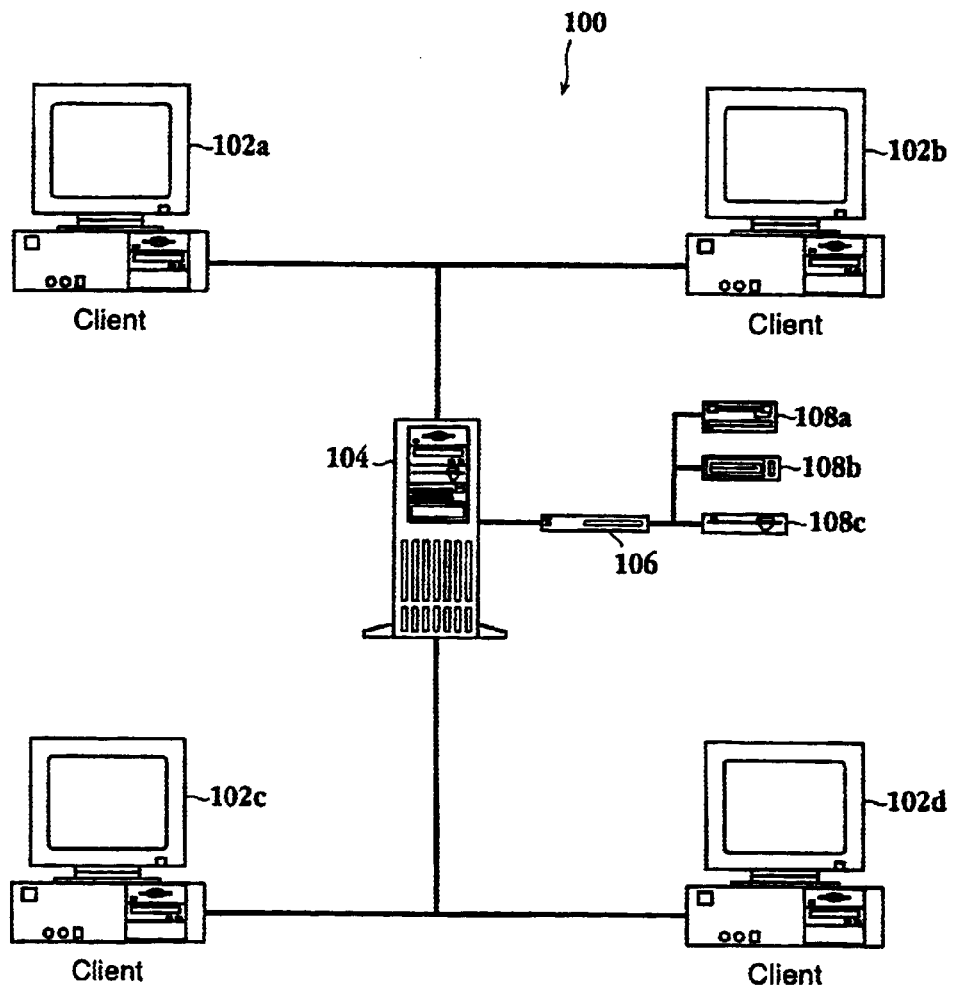
FIG. 1A shows a network diagram having several computers connected to a server computer.
Figure 1B:
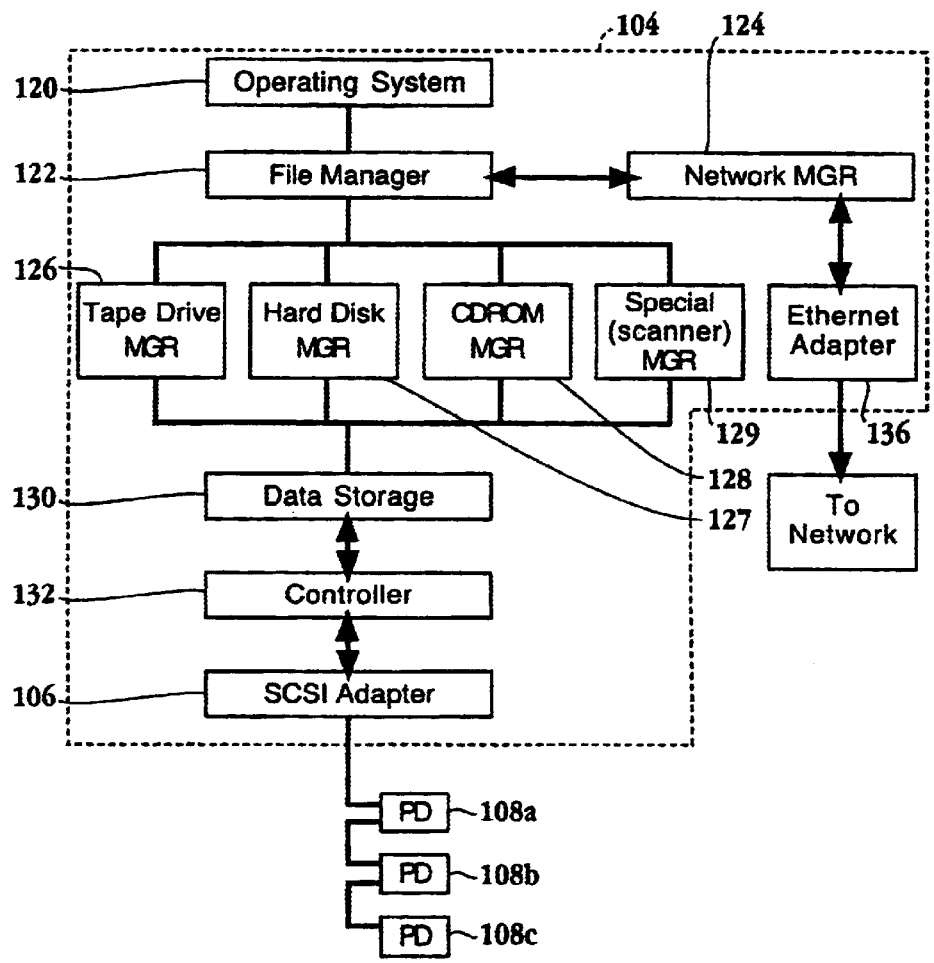
FIG. 1B shows a prior art block diagram of several functional units that are implemented by a server computer.
Figure 2:
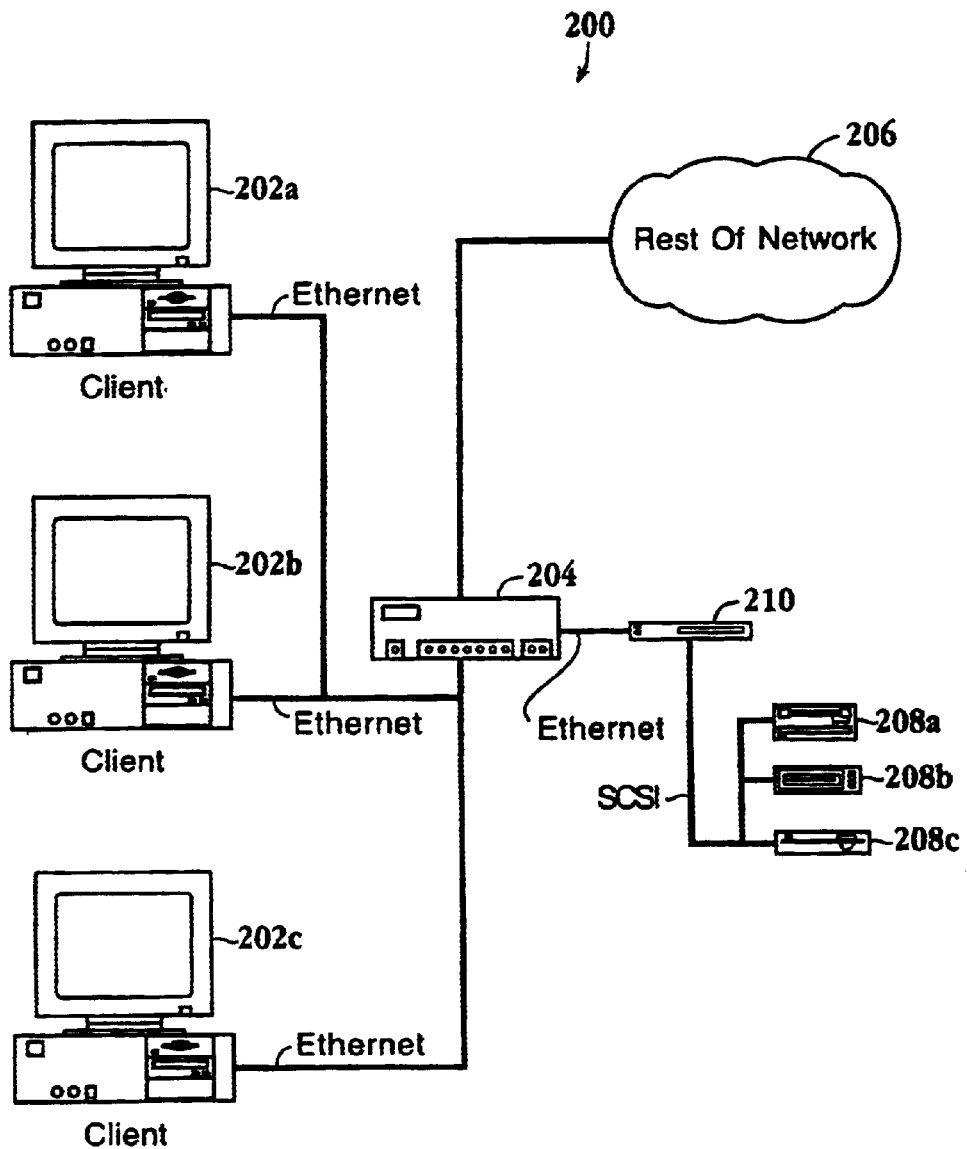
FIG. 2 shows a network diagram including a translation adapter for sharing peripheral devices in accordance with one embodiment of the present invention.

FIG. 2 shows a network diagram 200 including a translation adapter 210 for sharing peripheral devices in accordance with one embodiment of the present invention. In this example, client computers 202a through 202c are connected to a network hub 204. Each of the client computers 202a through 202c are preferably equipped with an Ethernet adapter card that enables network communication with the network hub 204 and with computers that may be connected over the rest of the network 206. The network hub 204 therefore enables the translation adapter 210 to be coupled up through its own Ethernet adapter.

The translation adapter 210 will preferably include the capability of receiving Ethernet packets from a client that is connected over the network, and that may desire to communicate SCSI commands or data to selected peripheral devices 208a through 208c. To accomplish this, each of the client computers 202a through 202c is preferably equipped with a virtual SCSI mini-port driver that is configured to encapsulate SCSI request block (SRBs) and data into TCP/IP packets before being transmitted over the network.

A typical SCSI mini-port driver is a component that is typically packaged with Microsoft Windows and Microsoft NT operating systems, and is part of a layered device driver architecture. Further, a SCSI request block (SRB) is a data structure that contains a SCSI command. SCSI request blocks are described in more detail in an Advanced SCSI programming interface (ASPI) specification, which is available from Adaptec, Inc. In addition, reference may be made to Adaptec's ASPI_DEV.TXT., which is an ASPI developers kit containing the ASPI specification for DOS, Windows, OS/2, and Netware, and is hereby incorporated by reference.

The translation adapter 210 therefore acts as an Ethernet-to-SCSI hardware converter that efficiently provides access to the SCSI peripheral devices 208a–208c from any one of the client computers 202a through 202c (or any other computer that is networked with the translation adapter 210).

As mentioned above, each of the clients 202a through 202c are preferably loaded with a SCSI-to-TCP/IP driver that is implemented as a virtual SCSI mini-port driver. The virtual SCSI mini-port driver is configured to emulate the capabilities and functionalities of a SCSI host adapter, although each of the client computers 202a through 202c do not actually have a physical SCSI host adapter. Accordingly, the communication protocol that is traditionally performed through a physical SCSI host adapter on a local computer (i.e., to access SCSI devices that are actually connected to the local computer) will be emulated by the SCSI mini-port driver and the translation adapter 210. However, to the user of a local client computer system, the access and operation of remotely networked peripheral devices will proceed as if the peripheral devices were actually physically connected to the local computer. In actuality, those peripheral devices are remotely networked, and accessible by all of the client computers that have Ethernet access the network.

The translation adapter 210 preferably has an Ethernet device driver, a TCP/IP layer, and a SCSI layer. The TCP/IP layer manages the packets that contain SCSI commands, status, or data, and is also responsible for sending and receiving data to and from the correct client computer and generating delivery of data. Thus, data received from the TCP/IP layer is passed to the SCSI layer for execution, and the data received from the SCSI layer is passed to the TCP/IP layer for transmission to the appropriate client over the network.

The translation adapter 210 therefore enables network users in a small office or home environment to share the peripheral devices that are connected to the translation adapter 210, without having to purchase expensive server computer systems. The ability to share these peripheral devices is quite powerful, and sharing of such devices also removes the need for purchasing redundant peripheral devices for each computer that is networked together. In one embodiment, the shared peripheral devices may include hard disk drives, removable disc drives, tape drives, optical disc drives, scanners, etc. Thus, each of the networked client computers 202a through 202c will have access to those peripheral devices that are connected to the translation adapter 210 even though each of the client computers 202a through 202c only have a standard Ethernet adapter that allows connection to a particular network.

Figure 3A:
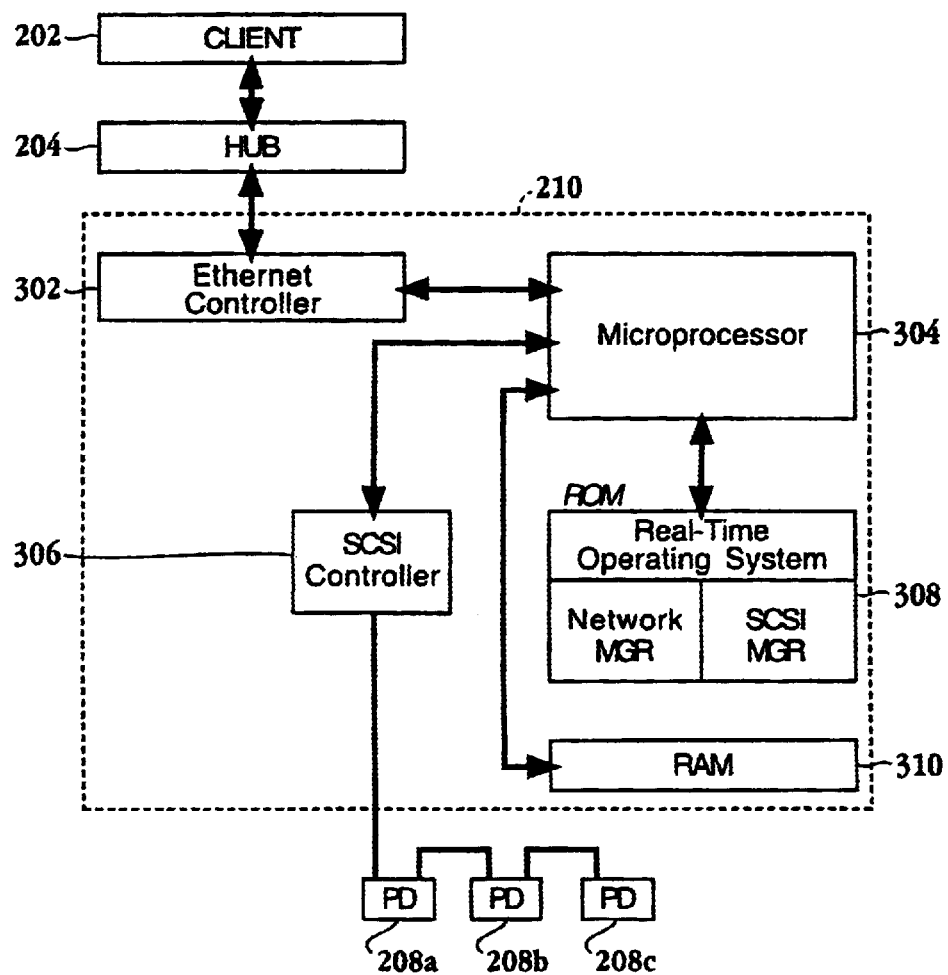
FIG. 3A shows a block diagram of the translation adapter in accordance with one embodiment of the present invention.

FIG. 3A shows a block diagram of the translation adapter 210 in accordance with one embodiment of the present invention. In this example, the translation adapter 210 connects up to the hub 204 via an Ethernet controller 302. The Ethernet controller 302 is in communication with a microprocessor 304. The microprocessor 304 is in communication with a ROM 308, which contains a Real-Time operating system, a network manager, and a SCSI manager. Real-Time operating systems and network managers are available from Accelerated Technology, Inc. of Mobile, Ala. The ROM 308 may be any type of non-volatile memory device, including a simple ROM device, a EEPROM device, an EPROM device, or a PROM device. The microprocessor 304 is also coupled to a RAM 310 device and a SCSI controller 306. The SCSI controller 306 is connected to the peripheral devices 208a through 208c. As mentioned above, the peripheral devices are preferably SCSI devices.

Figure 3B:
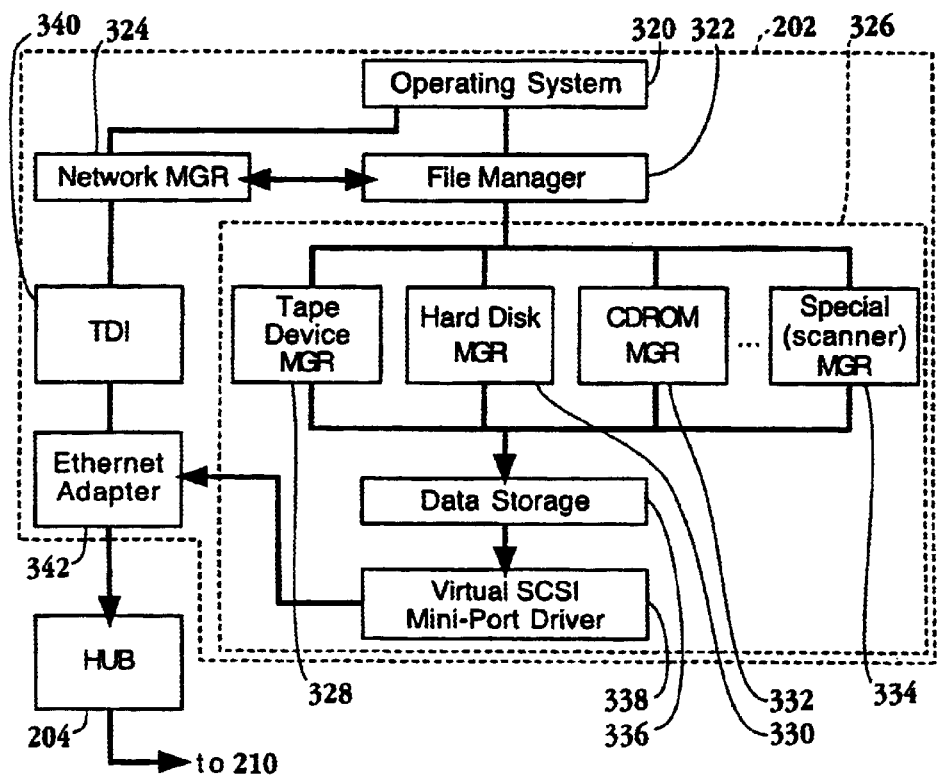
FIG. 3B shows a more detailed block diagram of a client computer in accordance with one embodiment of the present invention.

FIG. 3B shows a more detailed block diagram of a client computer 202 in accordance with one embodiment of the present invention. The client computer 202 is shown having an operating system 320, which may be any suitable operating system such as Windows 95, Windows 98, Windows NT, or any other suitable operating system which has access to a TCP/IP software driver. The operating system 320 is in communication with a file manager 322 and a network manager 324. The network manager 324 is configured to communicate with the operating system 320 and manage data transfers over a network.

The network manager 324 also communicates with a file manager 322 and is in communication with a transport driver interface (TDI) 340. The TDI 340 is then in communication with an Ethernet controller 342, which enables the client computer 202 to transfer data over a network (ie., and couple up to a hub 204 or other network connection). As shown in FIG. 2 above, the hub 204 communicates with the translation adapter 210 to enable access to any one of the peripheral devices that may be connected to the translation adapter 210. In this embodiment, the TDI 340 is configured to use the TCP/IP protocol for transmitting and receiving data to and from the translation adapter 210 through the Ethernet controller 342.

The file manager 322 is in communication with a local device manager 326, which includes managers for controlling access to various types of peripheral devices. In this example, the local device manager 326 includes a tape device manager 328, a hard disk manager 330, a CD-ROM manager 332, a special (scanner) manager 334, etc. The various local device managers are capable of communicating with a data storage unit 336. The data storage unit 336 is also in communication with a virtual SCSI mini-port driver 338, which accesses the TDI 340.

It should be noted that the client computer 220 does not actually have a SCSI adapter card, and therefore does not have any SCSI peripheral devices physically connected to itself. However, as mentioned above, the client computer 202 may desire to access to the peripheral devices that may be connected to the translation adapter 210. To accomplish this, when the virtual SCSI mini-port driver 338 is loaded onto the client computer 202, the virtual SCSI mini-port driver 238 examines the network to determine if there is a translation adapter 210 connected to the network.

If a translation adapter 210 does exist on the network, this virtual SCSI mini-port driver 338 informs the operating system 320 that a SCSI host adapter exists on the client computer 202. Of course, no actual SCSI host adapter actually exists on the client computer 202, but the virtual SCSI mini-port driver 338 will emulate all of the functionality that is typically performed by a physical SCSI host adapter. Thus, when the virtual SCSI mini-port driver 338 receives SCSI commands or data, it is transferred to the TDI 340 which uses the TCP/IP protocol for transmitting and receiving the data and commands to the translation adapter 210 via the Ethernet controller 342.

It should be appreciated that the virtual SCSI mini-port driver 338 provides all of the functionality that a physical SCSI host adapter would provide, and therefore fools the client computer 202 into believing that there is an actual physical SCSI host adapter connected to the client computer 202. Thus, the user of the client computer 202 can access remotely networked peripheral devices as if they were actually connected to itself.

Figure 3C:
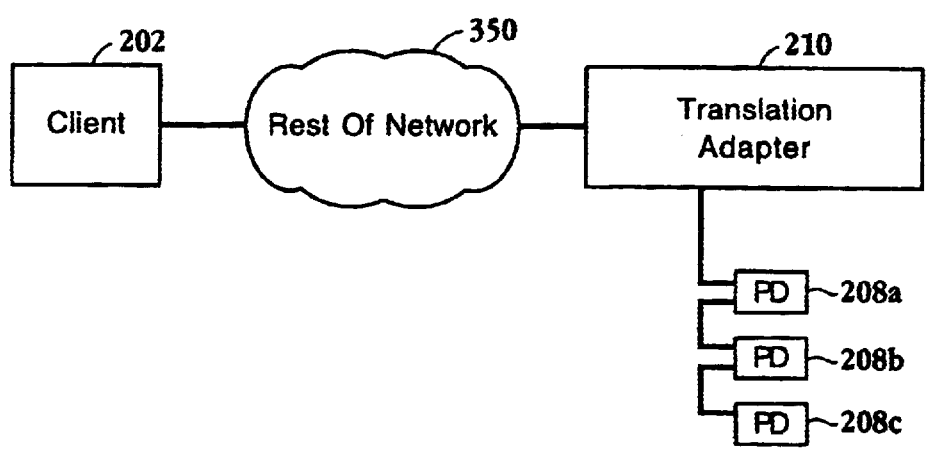
FIG. 3C shows a simplified block diagram illustrating the interaction between a client computer and a translation adapter in accordance with one embodiment of the present invention.

FIG. 3C shows a simplified block diagram illustrating the interaction between a client computer 202 and a translation adapter 210 in accordance with one embodiment of the present invention. In brief, the client computer 202 is able to share the peripheral devices 208a through 208c that are remotely connected to the networked translation adapter 210. All that the client 202 requires is an Ethernet connection to a network 350, and that the translation adapter 210 be somehow connected to the network 350. When these requirements are met, the client computer once loaded with the virtual SCSI mini-port driver 338, will be able to detect the presence of the translation adapter 210 over the network 350. When the client computer 202 detects that there is a translation adapter 210 connected to the network 350, SCSI commands and data will be transferred to selected peripheral devices through the translation adapter 210.

Figure 4:
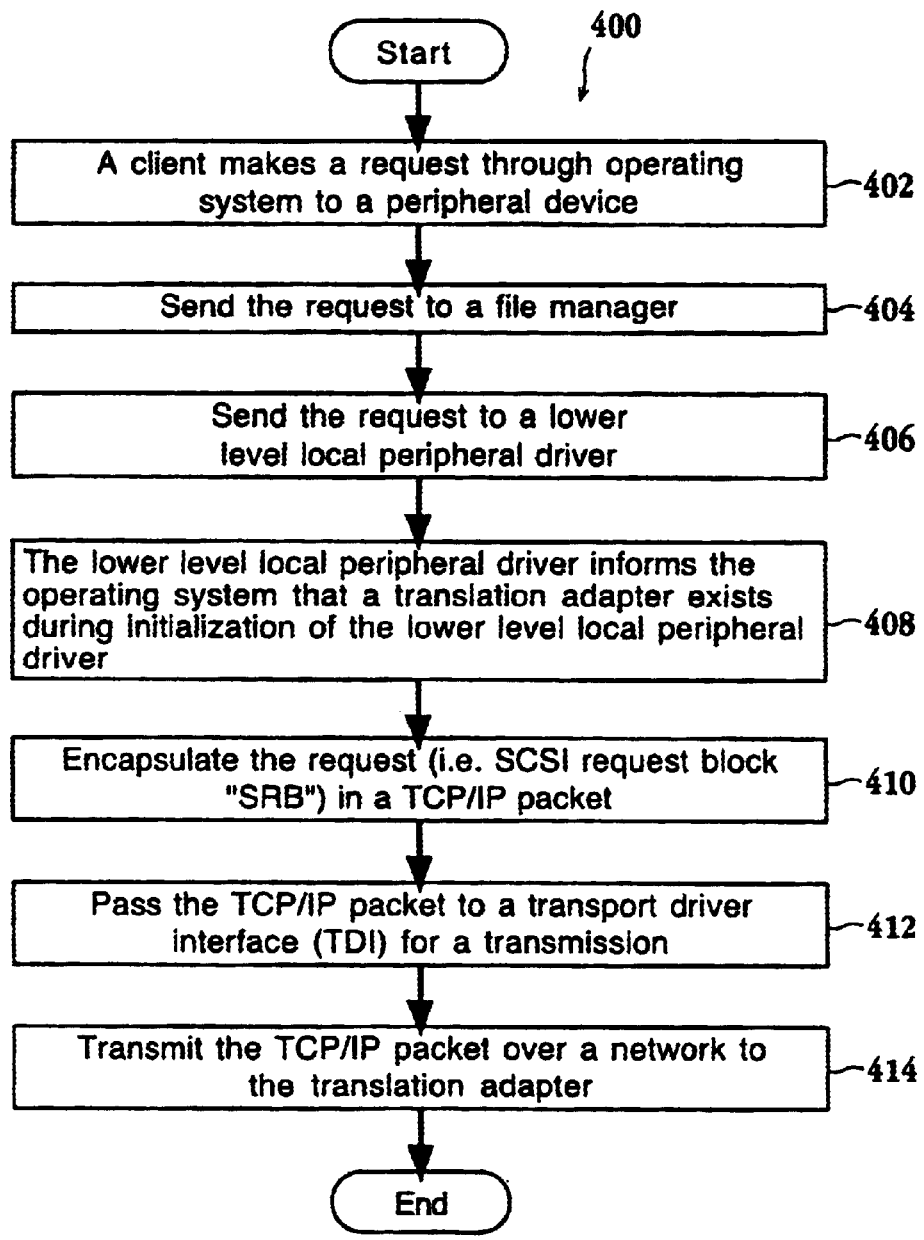
FIG. 4 shows the functional method operations that are performed by a client computer that desires access to a remotely located peripheral device in accordance with one embodiment of the present invention.

FIG. 4 shows the functional method operations 400 that are performed by a client computer 202 that desires access to a remotely located peripheral device. The method begins at an operation 402, where a client makes a request through its operating system to access a particular peripheral device. The method then proceeds to an operation 404 where the request is sent to a file manager of the client computer. The file manager then sends the request to a lower level local peripheral driver in operation 406. The lower level local peripheral driver is the driver that controls the type of peripheral device for which the client is requesting access.

From operation 406, the method proceeds to an operation 408 where the lower level local peripheral driver informs the operating system that a translation adapter exists over the network during initialization of the lower level local peripheral driver. Next, the method proceeds to an operation 410 where the request, which is in the form of a SCSI request block (SRB), is encapsulated into TCP/IP packet. Once the request has been encapsulated in operation 410, the method proceeds to an operation 412 where the TCP/IP packet is passed to a transport driver interface (TDI) for transmission.

Once the packet has been passed to the TDI, the method proceeds to an operation 414 where the TCP/IP packet is transmitted over the network to the translation adapter via an Ethernet controller. At that point, the packet will be received by the translation adapter 210, which decodes the TCP/IP packet back into the SRB request. The translation adapter 210 will then pass the SRB request to the desired peripheral device, which may be remotely located from the client computer which is making the particular request. Once the request has been transmitted to the desired peripheral device, the request will be executed and the method will end.

Figure 5A:
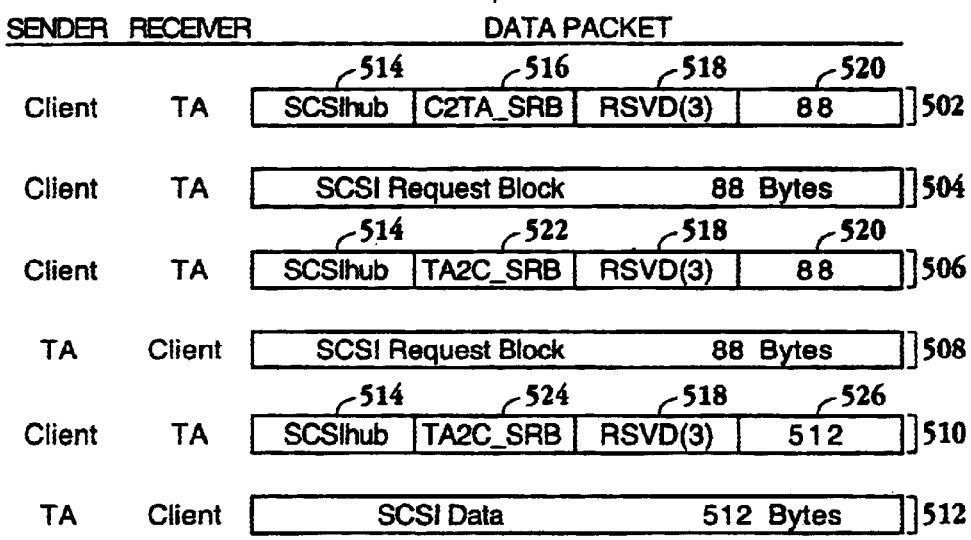
FIGS. 5A and 5B illustrate the data format that is transferred in a TCP/IP packet form during an exemplary "read" request and an exemplary "write" request made by a client computer in accordance with one embodiment of the present invention.
Figure 5B:
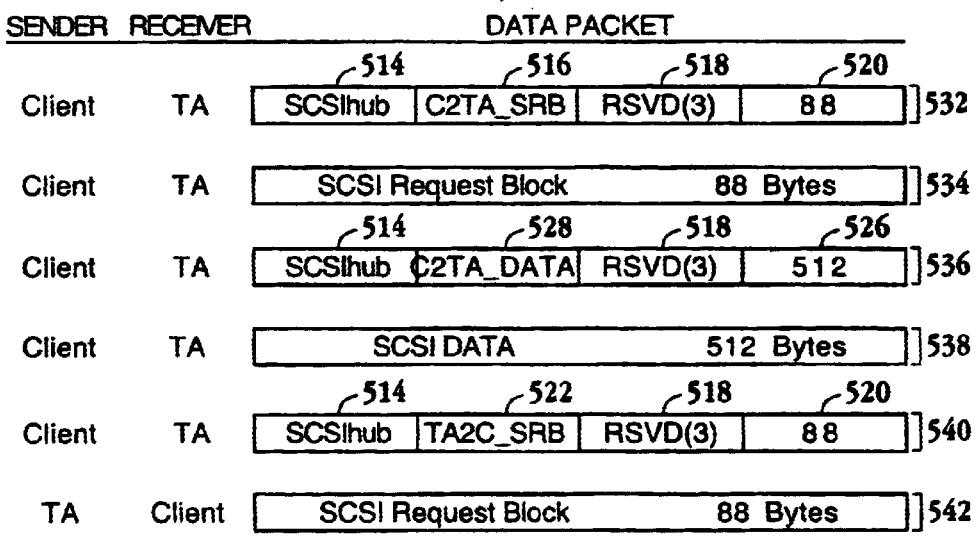

FIGS. 5A and 5B illustrate the data format that is transferred in a TCP/IP packet form during an exemplary "read" request and an exemplary "write" request made by a client computer 202 in accordance with one embodiment of the present invention. For example, the data format provided by TCP/IP is in the form of byte streams. That is, there is no data record boundary in the stream of bytes. In this embodiment of the present invention, a mechanism is provided to form data record boundaries, and to define a handshaking protocol between a particular requesting client computer and a translation adapter, so that both ends of a connection understand what to expect and what is contained in the data being transmitted. This mechanism therefore encapsulates SCSI commands, status, and data in a TCP/IP packet for transmission over the network.

In this embodiment of the present invention, the translation adapter 210 is a passive device. After a connection has been established with a client computer, the translation adapter 210 indefinitely waits to receive data from the client computer. The translation adapter 210 first looks for a 16-byte header, and then validates the header by examining an 8-byte SCSIHubId field for a "SCSIHUB" signature.

From the information contained in the 8-byte SCSIHubId field, the translation adapter 210 can determine the data type, the direction, and the size of the subsequent data transfer, and then act upon the information.

The interaction between a client and the translation adapter will first be described with respect to the exemplary "read" request as shown in FIG. 5A. Because the translation adapter 210 is a passive device, the initial sender of a TCP/IP packet will always be a client computer. A packet 502 is first shown being sent by a client to the translation adapter (TA). The packet 502 includes a SCSIHUB 514 which is the 8-byte signature described above. The next part of the packet is a direction flag 516, which indicates that the direction of a SCSI request block (SRB) is being sent from the client to the translation adapter (C2TA_SRB). The next portion of the packet 502 is a 3-byte reserved field 518. Finally, the packet 502 includes a 4-byte count field 520, which indicates that the next data packet will contain 88 bytes. The next packet 504 is the actual SCSI request block, that is sent from the client to the translation adapter and contains 88 bytes.

Packets 506 and 508 represent the confirmation packets that are sent from the translation adapter to the client confirming the SCSI request block that was previously sent by the client to the translation adapter. Specifically, packet 506 includes the 8-byte SCSIHUB header 514, and a direction flag 522 which indicates that the packet is being sent from the translation adapter to the client (TA2C_SRB). The next portion of the packet 506 is a 3-byte reserved field 518, and a 4-byte count field 520 which indicates that the next SCSI request block will be 88 bytes. Thus, packet 508 will be the confirmation SCSI request block sent from the translation adapter to the client.

The client then sends packet 510 to the translation adapter that is requesting data from a particular peripheral device that is connected to the translation adapter. Specifically, packet 510 includes a SCSIHUB header 514, a direction field indicating that the translation adapter will be sending data to the client (TA2C_DATA). The next portion is the 3-byte reserved field 518 and a 4-byte count field 526 which indicates that the next packet will contain 512 bytes. Finally, packet 512 indicates that the translation adapter has sent the client SCSI data of 512 bytes. At this point, the client has successfully completed a read of 512 bytes from a particular SCSI device that is connected to the translation adapter.

Reference is now made to FIG. 5B where the exemplary "write" request is made from a client to the translation adapter in accordance with one embodiment of the present invention. Initially, the client sends the translation adapter a packet 532 which includes the 8-byte SCSIHUB header 514, a direction flag 516, a reserved field 518, and a 4-byte count 520. The direction field 516 indicates that the client is sending an SRB to the translation adapter, and the SRB will be 88 bytes as indicated by the 4-byte count field 520. The client then sends the SCSI request block that is 88 bytes in packet 534.

A packet 536 is next sent from the client to the translation adapter indicating that data containing 512 bytes will be sent by the client to the translation adapter so the translation adapter can send that data to a desired peripheral device for writing. As shown, a direction field 528 indicates that data will be sent from the client to the translation adapter (C2TA_DATA). Also, the 4-byte count field 526 indicates that 512 bytes will be sent from the client to the translation adapter. In packet 538, the client sends the translation adapter 512 bytes of SCSI data that will be transmitted to a particular SCSI device for writing.

In packets 540 and 542, the translation adapter confirms to the client that the writing of the data to a particular peripheral device has been completed. Specifically, packet 540 includes a SCSIHUB header 514, and a direction field 522 which indicates that an SRB will be sent from the translation adapter to the client. In addition, the 4-byte count field 520 will indicate that 88 bytes will be contained in the SCSI request block. Packet 542 is the actual SCSI request block that is sent from the translation adapter to the client indicating that the writing of data has been completed to a particular peripheral device.

Figure 5C:
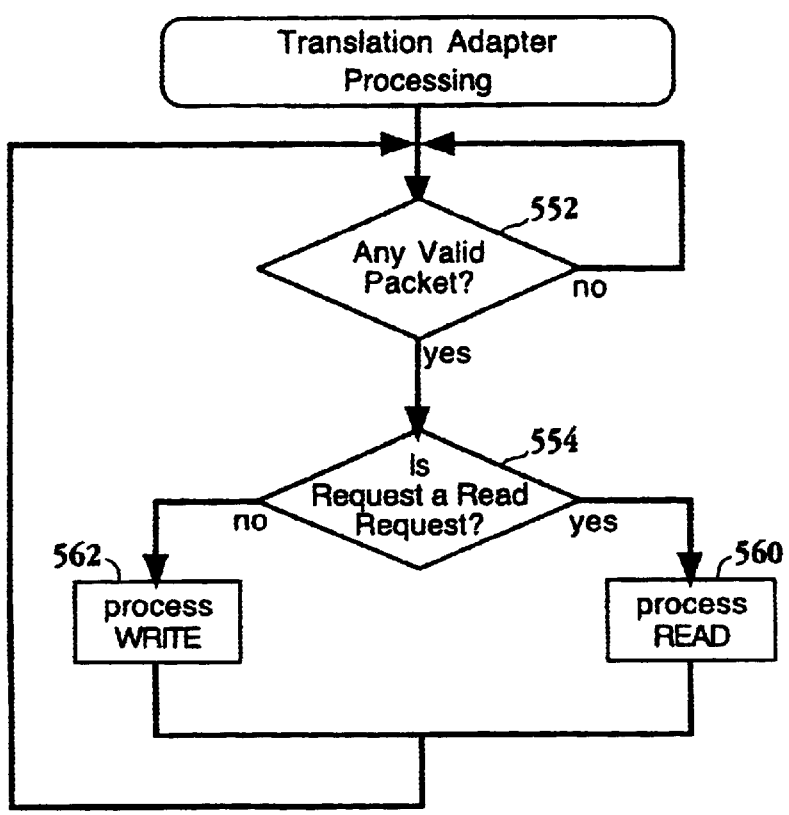
FIG. 5C shows the processing performed by the translation adapter of FIG. 3A in accordance with one embodiment of the present invention.

FIG. 5C shows the processing performed by the translation adapter 210 of FIG. 3A in accordance with one embodiment of the present invention. The method begins at a decision operation 552 where it is determined if any valid packet has been received by the translation adapter. Because the translation adapter is a passive device, it will sit until an actual packet designated for the translation adapter is received. When a valid packet has been received by the translation adapter, the method will proceed to a decision operation 554.

In decision operation 554, it is determined if the request is a read request. If the request is a read request, the method will proceed to process the read request at operation 560. On the other hand, if the request is not a read request, the method will proceed to process a write request in operation 562. As described above with respect to FIGS. 5A and 5B, the processing of a read request will commence when the translation adapter receives a TCP/IP packet and then reads a 16-byte header to determine if the packet is intended for the translation adapter. Once the 16-byte header has been read, an 8-byte SCSIHubId header is examined in order to validate the SCSIHUB signature. This process will therefore be repeated each time a SCSIHUB 514 is received during a read or a write request.

Figure 5D:
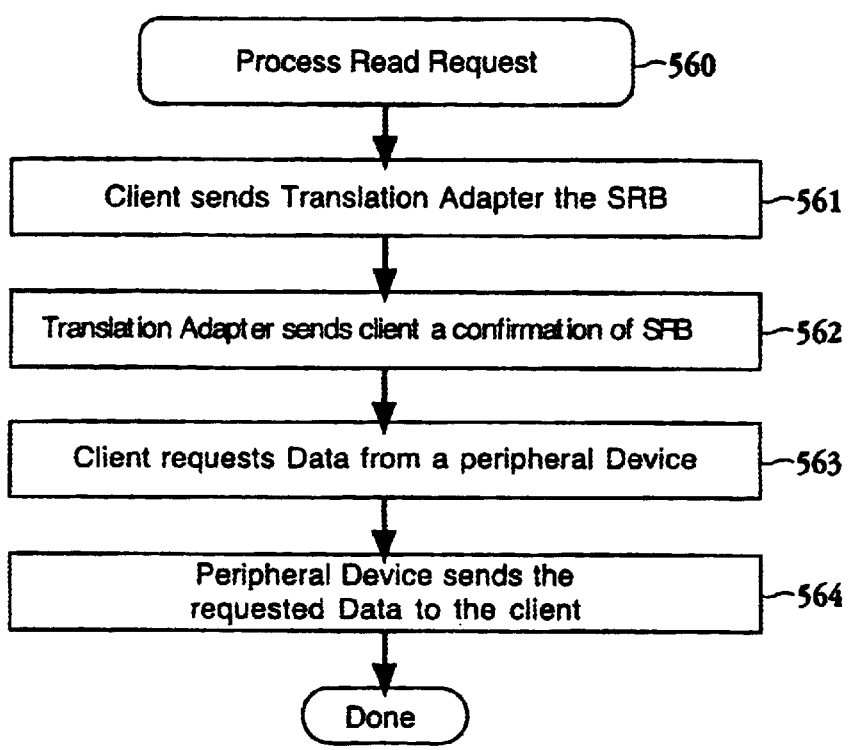
FIG. 5D illustrates the exemplary processing performed during a read request in accordance with one embodiment of the present invention.

FIG. 5D illustrates the exemplary processing performed during a read request 560 in accordance with one embodiment of the present invention. The processing of the read request begins at an operation 561 where the client sends the translation adapter the SCSI request block (SRB). With reference to FIG. 5A, packets 502 and 504 are exchanged during the sending of the SRB to the translation adapter. Next, the method proceeds to an operation 562 where the translation adapter sends a confirmation of the SRB.

In the example of FIG. 5A, the confirmation may include the transmission of packets 506 and 508. Next, the method proceeds to an operation 563 where the client requests data from a peripheral device. As an example, the client may request data from a particular peripheral device by sending the packet 510 to the translation adapter as shown in FIG. 5A. Once the client requests data from a peripheral device in operation 563, the method proceeds to an operation 564. In operation 564, the peripheral device sends the requested data to the client through the translation adapter. Again, FIG. 5A shows the sending of the requested data by the exemplary packet 512.

Figure 5E:
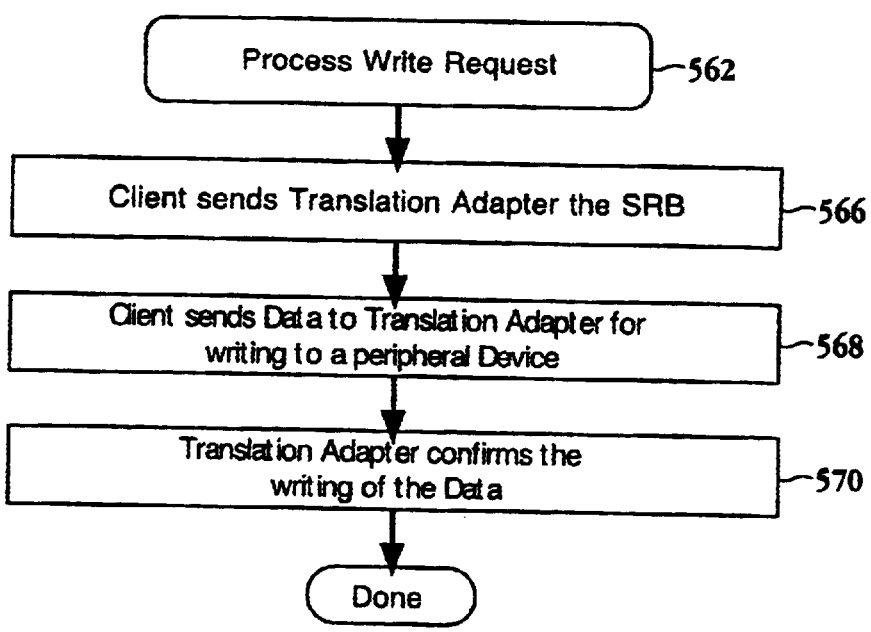
FIG. 5E shows the process operations performed when a write request process is completed in accordance with one embodiment of the present invention.

FIG. 5E shows the process operations performed when a write request process 562 is completed in accordance with one embodiment of the present invention. The write request process begins at an operation 566 where a client sends a translation adapter the SCSI request block (SRB). In the write request example of FIG. 5B, the client sending the translation adapter the SRB may be completed by sending packets 532 and 534. Once the client sends the translation adapter the SRB in operation 566, the method proceeds to an operation 568.

In operation 568, the client sends data to the translation adapter for writing to a peripheral device. Referring again to FIG. 5B, packets 536 and 538 illustrate an example of a client sending data to the translation adapter for writing to a peripheral device. Next, the method proceeds to an operation 570 where the translation adapter confirms the writing of the data. This confirmation is again shown by the exemplary packets 540 and 542 of FIG. 5B.

The present invention may be implemented using any type of integrated circuit logic, state machines, or software driven computer-implemented operations. By way of example, a hardware description language (HDL) based design and synthesis program may be used to design the silicon-level circuitry necessary to appropriately perform the data and control operations in accordance with one embodiment of the present invention. By way of example, a VHDL hardware description language available from IEEE of New York, N.Y. may be used to design an appropriate silicon-level layout.

The invention may also employ various computer-implemented operations involving data stored in computer systems. These operations are those requiring physical manipulation of physical quantities. Usually, though not necessarily, these quantities take the form of electrical or magnetic signals capable of being stored, transferred, combined, compared, and otherwise manipulated. Further, the manipulations performed are often referred to in terms, such as producing, identifying, determining, or comparing.

Any of the operations described herein that form part of the invention are useful machine operations. The invention also relates to a device or an apparatus for performing these operations. The apparatus may be specially constructed for the required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations. An exemplary structure for the invention is described below.

Figure 6:
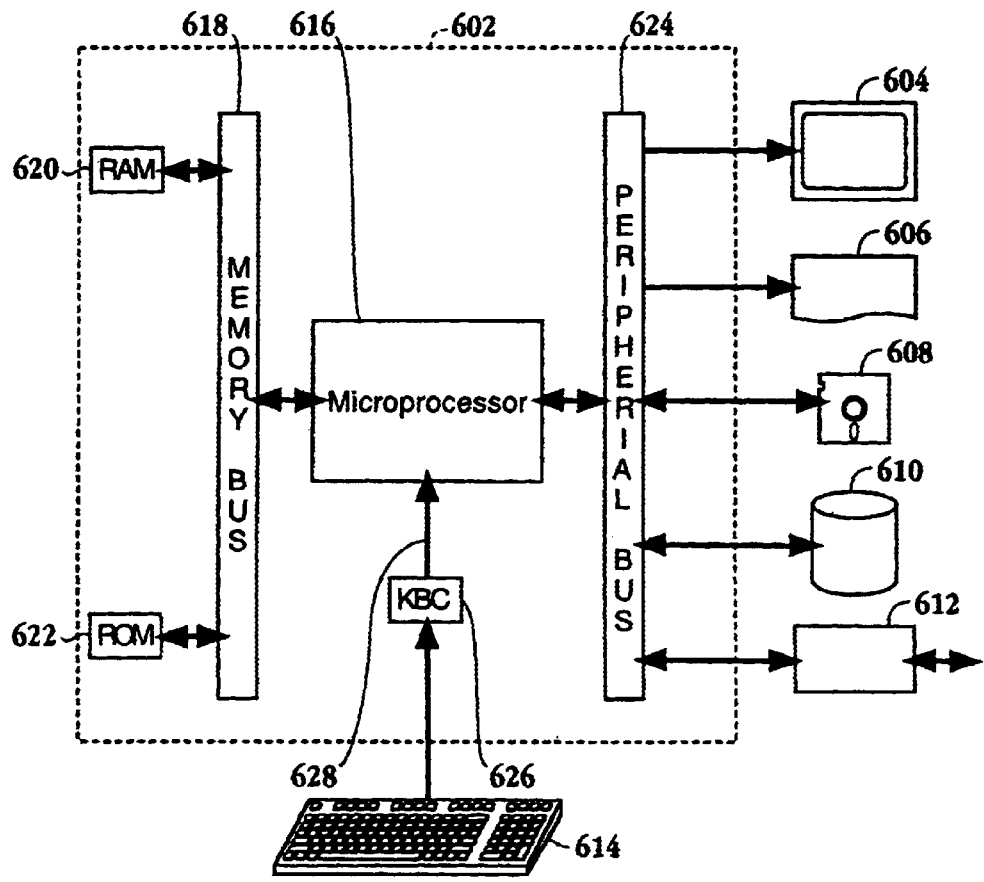
FIG. 6 is a block diagram of an exemplary computer system for carrying out some of the processing according to the invention.

FIG. 6 is a block diagram of an exemplary computer system 600 for carrying out the processing according to the invention. The computer system 600 includes a digital computer 602, a display screen (or monitor) 604, a printer 606, a floppy disk drive 608, a hard disk drive 610, a network interface 612, and a keyboard 614. The digital computer 602 includes a microprocessor 616, a memory bus 618, random access memory (RAM) 620, read only memory (ROM) 622, a peripheral bus 624, and a keyboard controller 626. The digital computer 600 can be a personal computer (such as an IBM compatible personal computer, a Macintosh computer or Macintosh compatible computer), a workstation computer (such as a Sun Microsystems or Hewlett-Packard workstation), or some other type of computer.

The microprocessor 616 is a general purpose digital processor which controls the operation of the computer system 600. The microprocessor 616 can be a single-chip processor or can be implemented with multiple components. Using instructions retrieved from memory, the microprocessor 616 controls the reception and manipulation of input data and the output and display of data on output devices. According to the invention, a particular function of microprocessor 616 is to assist in the processing of remote network communication with peripheral devices from local client computers.

The memory bus 618 is used by the microprocessor 616 to access the RAM 620 and the ROM 622. The RAM 620 is used by the microprocessor 616 as a general storage area and as scratch-pad memory, and can also be used to store input data and processed data. The ROM 622 can be used to store instructions or program code followed by the microprocessor 616 as well as other data.

The peripheral bus 624 is used to access the input, output, and storage devices used by the digital computer 602. In the described embodiment, these devices include the display screen 604, the printer device 606, the floppy disk drive 608, the hard disk drive 610, and the network interface 612. The keyboard controller 626 is used to receive input from keyboard 614 and send decoded symbols for each pressed key to microprocessor 616 over bus 628.

The display screen 604 is an output device that displays images of data provided by the microprocessor 616 via the peripheral bus 624 or provided by other components in the computer system 600. The printer device 606 when operating as a printer provides an image on a sheet of paper or a similar surface. Other output devices such as a plotter, typesetter, etc. can be used in place of, or in addition to, the printer device 606.

The floppy disk drive 608 and the hard disk drive 610 can be used to store various types of data. The floppy disk drive 608 facilitates transporting such data to other computer systems, and hard disk drive 610 permits fast access to large amounts of stored data.

The microprocessor 616 together with an operating system operate to execute computer code and produce and use data. The computer code and data may reside on the RAM 620, the ROM 622, or the hard disk drive 610. The computer code and data could also reside on a removable program medium and loaded or installed onto the computer system 600 when needed. Removable program mediums include, for example, CD-ROM, PC-CARD, floppy disk and magnetic tape.

The network interface 612 is used to send and receive data over a network connected to other computer systems. An interface card or similar device and appropriate software implemented by the microprocessor 616 can be used to connect the computer system 600 to an existing network and transfer data according to standard protocols.

The keyboard 614 is used by a user to input commands and other instructions to the computer system 600. Other types of user input devices can also be used in conjunction with the present invention. For example, pointing devices such as a computer mouse, a track ball, a stylus, or a tablet can be used to manipulate a pointer on a screen of a general-purpose computer.

The invention can also be embodied as computer readable code on a computer readable medium. The computer readable medium is any data storage device that can store data which can be thereafter be read by a computer system. Examples of the computer readable medium include read-only memory, random-access memory, CD-ROMs, magnetic tape, optical data storage devices. The computer readable medium can also be distributed over a network coupled computer systems so that the computer readable code is stored and executed in a distributed fashion.

Although the foregoing invention has been described in some detail for purposes of clarity of understanding, it will be apparent that certain changes and modifications may be practiced within the scope of the appended claims. Accordingly, the present embodiments are to be considered as illustrative and not restrictive, and the invention is not to be limited to the details given herein, but may be modified within the scope and equivalents of the appended claims.

What is claimed is:

1. A method for accessing a SCSI peripheral device from a client computer, the client computer having a network adapter for connecting to a network, the SCSI peripheral device being remote from the client computer, the method comprising:

generating a SCSI request through an operating system of the client computer;

detecting the presence of a remote translation adapter by examining the network through a virtual SCSI miniport driver, the remote translation adapter configured to communicate with a plurality of SCSI devices;

encapsulating the SCSI request in a TCP/IP packet, the TCP/IP packet containing data record boundaries; and transmitting the TCP/IP packet through the network adapter in the client computer to the translation adapter that is configured to decode the TCP/IP packet back into the SCSI request that is then passed to the SCSI peripheral device that is connected to the translation adapter over a SCSI bus, wherein the client computer is configured to send the TCP/IP packet to the translation adapter and wherein the translation adapter is a passive device that remains in a full-powered wait state until the TCP/IP packet is received from the client computer before processing the request in the TCP/IP packet.

2. A method for accessing a SCSI peripheral device from a client computer as recited in claim 1, wherein the transmitting of the TCP/IP packet through the network adapter further includes:

sending the TCP/IP packet to a transport driver interface before the TCP/IP packet is passed to the network adapter of the client computer.

3. A method for accessing a SCSI peripheral device from a client computer as recited in claim 2, further comprising:

sending the SCSI request from the operating system to a file manager of the client computer; and sending the SCSI request to a lower level local peripheral driver that informs the operating system of the client computer that a translation adapter is connected to the network when the lower level local peripheral driver is initialized.

4. A method for accessing a SCSI peripheral device from a client computer as recited in claim 2, wherein the SCSI request is one of a read request and a write request.

5. A method for accessing a SCSI peripheral device from a client computer as recited in claim 4, wherein the SCSI request includes SCSI commands, SCSI status, and SCSI data.

6. A method for accessing a SCSI peripheral device from a client computer as recited in claim 5, wherein processing the read request includes:

sending a SCSI request block by the client computer to the translation adapter;

confirming the SCSI request block by the translation adapter;

requesting data by the client computer from the SCSI peripheral device; and sending the data by the SCSI peripheral device to the client computer through the translation adapter.

7. A method for accessing a SCSI peripheral device from a client computer as recited in claim 5, wherein processing the write request includes:

sending a SCSI request block by the client computer to the translation adapter;

sending data to the translation adapter for writing to the SCSI peripheral device; and confirming the writing to the SCSI peripheral device by the translation adapter.

8. A method for accessing a SCSI peripheral device from a client computer as recited in claim 1, wherein the translation adapter is an Ethernet-to-SCSI converter.

9. A method for accessing a SCSI peripheral device from a client computer as recited in claim 1, wherein the virtual SCSI mini-port driver that is configured to perform the encapsulating of the SCSI request into the TCP/IP packet.

10. A system for establishing a communication link between a client computer and SCSI peripheral devices that are remotely networked to the client computer, comprising:

a remote translation adapter being networked with the client computer through a first network adapter of the translation adapter, the translation adapter further including a SCSI controller that connects to the SCSI peripheral devices over a SCSI bus;

a SCSI-to-TCP/IP driver being loaded on the client computer and configured to detect when the translation adapter is networked to the client computer, and further configured to generate a TCP/IP packet from a SCSI command, the TCP/IP packet containing data record boundaries; and a second network adapter being connected to the client computer and configured to receive the TCP/IP packet that is generated by the SCSI-to-TCP/IP driver, the second network adapter is further configured to transmit the TCP/IP packet to the first network adapter of the translation adapter, and the translation adapter is configured to translate the TCP/IP packet into the SCSI command, which is communicated to the SCSI peripheral devices that are connected to the translation adapter over the SCSI bus, wherein the client computer is configured to send the TCP/IP packet to the translation adapter and wherein the translation adapter is a passive device that remains in a full-powered wait state until the TCP/IP packet is received from the client computer before processing the request in the TCP/IP packet.

11. A system for establishing a communication link between a client computer and SCSI peripheral devices that are remotely networked to the client computer as recited in claim 10, wherein the translation adapter further includes:

a microprocessor that is in communication with the first network adapter card and the SCSI controller; a read only memory device that is in communication with the microprocessor; and a random access memory device that is in communication with the microprocessor.

12. A system for establishing a communication link between a client computer and SCSI peripheral devices that are remotely networked to the client computer as recited in claim 11, wherein the read only memory device stores program instructions for:

a real-time operating system;
a network manager; and
a SCSI manager.

13. A system for establishing a communication link between a client computer and SCSI peripheral devices that are remotely networked to the client computer as recited in claim 12, further comprising:

a network hub that is physically connected to the client computer and the translation adapter, and the SCSI peripheral devices are connected to the translation adapter.

14. A system for establishing a communication link between a client computer and SCSI peripheral devices that are remotely networked to the client computer as recited in claim 10, wherein the first network adapter is a first Ethernet controller, and the second network adapter is a second Ethernet controller.

15. A system for establishing a communication link between a client computer and SCSI peripheral devices that are remotely networked to the client computer as recited in claim 14, wherein the client computer further includes a transport driver interface that is in communication with the SCSI-to-TCP/IP driver and the second Ethernet controller.

16. An apparatus for establishing a data transfer link between a client computer and SCSI peripheral devices that are remotely networked to the client computer, comprising:

a remote translation means being networked with the client computer through a first Ethernet controller of the translation means, the translation means further including a SCSI controller that is physically coupled to the SCSI peripheral devices over a SCSI bus;

a SCSI-to-TCP/IP converting means being loaded on the client computer and configured to detect when the translation means is networked to the client computer, and further configured to produce a TCP/IP packet from one of a SCSI command and SCSI data, the TCP/IP packet containing data record boundaries; and a second Ethernet controller being connected to the client computer and configured to receive the TCP/IP packet that is produced by the SCSI-to-TCP/IP converting means, the second Ethernet controller being further configured to transmit the TCP/IP packet to the first Ethernet controller of the translation means, and the translation means being configured to convert the TCP/IP packet back into one of the SCSI command and the SCSI data, which are directed to the SCSI peripheral devices that are physically coupled to the translation means, wherein the client computer is configured to send the TCP/IP packet to the translation means and wherein the translation means is a passive device that remains in a full-powered wait state until the TCP/IP packet is received from the client computer before processing the request in the TCP/IP packet.

17. An apparatus for establishing a data transfer link between a client computer and SCSI peripheral devices that are remotely networked to the client computer as recited in claim 16, wherein the translation means further includes:

a processor means that is in communication with the first Ethernet controller and the SCSI controller;

a read only memory device that is in communication with the processor means; and a random access memory device that is in communication with the processor means.

18. An apparatus for establishing a data transfer link between a client computer and SCSI peripheral devices that are remotely networked to the client computer as recited in claim 17, wherein the read only memory device stores program instructions for:

a real-time operating system;
a network manager, and
a SCSI manager.

19. A method for accessing a SCSI peripheral device from a client computer as recited in claim 1, wherein the TCP/IP packet includes a header, a direction flag, and a packet size field, wherein the direction flag indicates whether the TCP/

IP packet is being passed from or to the client computer and wherein the packet size field indicates a size of data that will be transmitted in a next TCP/IP packet.

20. A system for establishing a communication link between a client computer and SCSI peripheral devices that are remotely networked to the client computer as recited in claim 10, wherein the TCP/IP packet includes a header, a direction flag, and a packet size field, wherein the direction flag indicates whether the TCP/IP packet is being passed from the client computer to the translation adapter or from the translation adapter to the client computer, and wherein the packet size field indicates a size of data that will be transmitted in a next TCP/IP packet.

21. An apparatus for establishing a data transfer link between a client computer and SCSI peripheral devices that are remotely networked to the client computer as recited in claim 16, wherein the TCP/IP packet includes a header, a direction flag, and a packet size field, wherein the direction flag indicates whether the TCP/IP packet is being passed from the client computer to the translation adapter or from the translation adapter to the client computer, and wherein the packet size field indicates a size of data that will be transmitted in a next TCP/IP packet.

* * * * *